United States Patent [19]

Lundgren

[11] 4,265,455

[45] May 5, 1981

[54] SEALING DEVICE

[75] Inventor: Bengt Lundgren, Lerum, Sweden

[73] Assignee: SKF Nova AB, Goteborg, Sweden

[21] Appl. No.: 960,660

[22] Filed: Nov. 14, 1978

[30] Foreign Application Priority Data

Dec. 1, 1977 [SE] Sweden .................................. 7713599

[51] Int. Cl.$^3$ ............................................. F16J 15/44
[52] U.S. Cl. ................................................... 277/53
[58] Field of Search ....................... 277/53, 56; 405/147

[56] References Cited

U.S. PATENT DOCUMENTS

| 885,032 | 4/1908 | Ferranti | 277/53 |
| 2,590,422 | 3/1952 | Large | 277/53 |

*Primary Examiner*—Robert I. Smith
*Attorney, Agent, or Firm*—Eugene E. Renz, Jr.

[57] ABSTRACT

The invention concerns a sealing device and is characterized by comprising an outer T-shaped supporting ring (5) and an inner U-shaped supporting ring (7), at least one sealing element (12, 13) preferably having flocked fibres being arranged between the outer and inner supporting ring.

3 Claims, 4 Drawing Figures

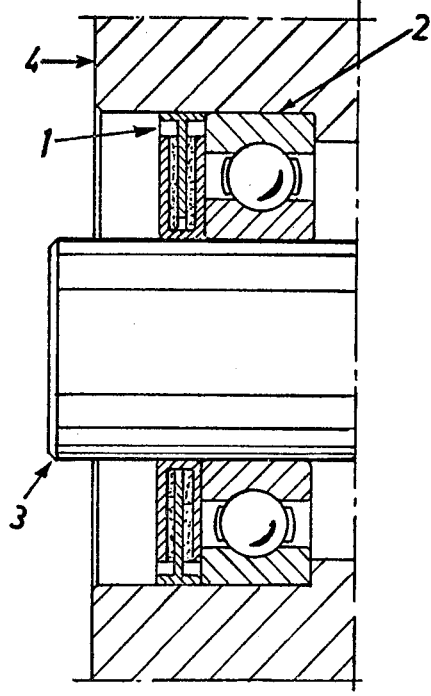
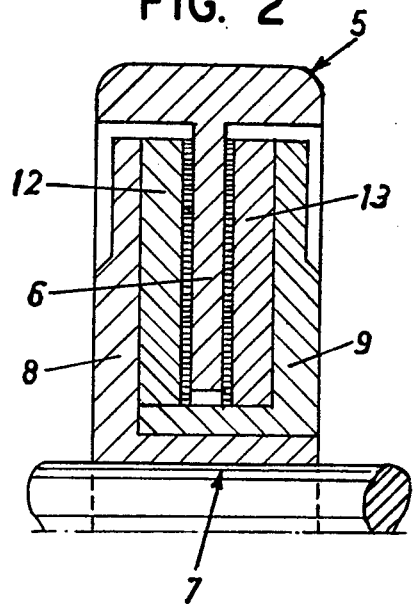
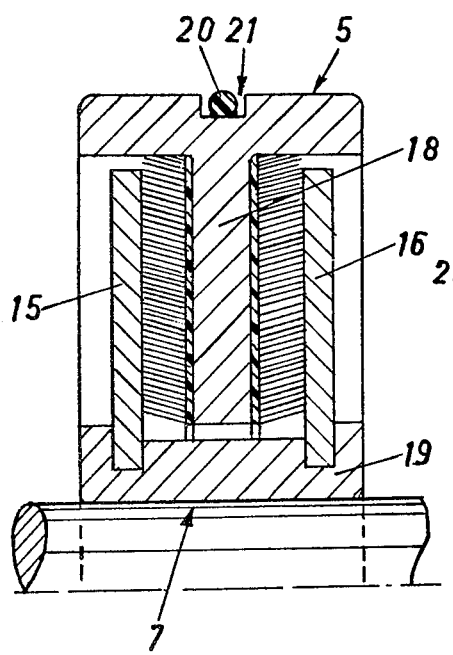
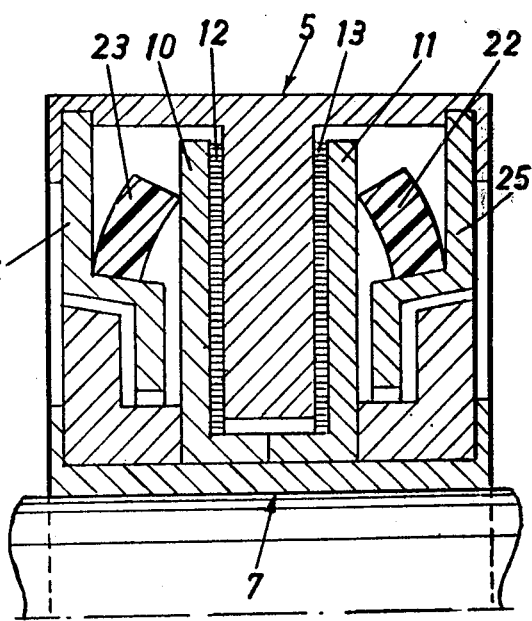

SEALING DEVICE

The present invention refers to a sealing device for sealing off the space between two machine members which are rotatable relative to each other.

A known problem at rotating machine members such as for instance supporting rolls for conveyor belts, where the supporting roll is rotatably supported on radial bearings e.g. ball bearings or roller bearings on a fixed shaft, is to prevent dust and other dirt particles from penetrating into the bearing. Even oils and moisture are in the long run harmful to the bearing and will influence the service life of the bearing. The problem is oftenly solved thereby that some type of known seal is provided in connection to the bearing on the outer or inner side of the bearing for preventing impurities from reaching the bearing and thereby jeopardizing the function and the service life thereof. It is important that the correct type of seal is chosen for the bearing and that consideration is given to the environment in which the bearing and the seal shall work. The fitting of the seal against the bearing and the surrounding machine members is furthermore very important and it must be kept within close tolerances. The bearing will generally last as long as the seal is sufficiently good.

The problem at known seals is that they often comprise a plurality of loose parts which means that the assembly must be extensive and that defects easily can result which will jeopardize the fitting of the seal in the space intended therefore and thereby influence the effectivity and the life span of the seal.

The purpose of the present invention is to provide a sealing device comprising a labyrinth seal and also a friction seal whereby the sealing device forms a unit which is kept together by itself, which is easily assembled, which has a good sealing effect and which eliminates the above mentioned drawbacks. The invention is characterized thereby that the sealing device incorporates an outer supporting ring having a mainly T-shaped cross section and an inner supporting ring having a mainly U-shaped cross section, that at least one and preferably two sealing members are provided between said inner and outer supporting rings, that the inner and outer supporting rings are arranged rotatably relative to each other, and that said inner supporting ring with its two shanks, encloses essentially the entire body portion of the outer, T-shaped supporting ring, whereby said supporting rings and sealing members form an integral unit.

Different embodiments of the invention will hereinafter be described with reference to the accompanying drawing wherein:

FIG. 1 shows a section of the bearing of a supporting roll together with a sealing device;

FIG. 2 shows a section of a sealing device according to the invention;

FIG. 3 shows a section of another embodiment of the sealing device according to invention; and FIG. 4 shows a section through a further embodiment of the sealing device according to the invention.

In FIG. 1 is shown a sealing device 1 according to the invention in its operating position i.e. located at the side of the bearing 2 turned outwards i.e. against the surrounding environment. The bearing 2 and the sealing device 1 are thereby fitted to a shaft, 3, whereby the bearing and the sealing device with the radially outer portions are arranged adjacent a further machine member, in this specific case a supporting roll 4 intimated in FIG. 1. Due to the fact that the sealing device 1 is formed as a single integral unit an easily assembled and thereby economic and safe seal is obtained. Air and other gases can thereby pass through the sealing device and through the bearing without allowing dust and other dirt particles to penetrate into the bearing 2 and to jeopardize its function. By designing the sealing device quite symmetric relative to a vertical plane through its centrum a possible pumping action is eliminated whereby it is unimportant how the sealing device is assembled with reference to such action. FIG. 2 shows more in detail an embodiment according to the invention whereby a section through the sealing device 1 shows an outer T-shaped supporting ring 5, the body portion 6 of which extends intowards the centre of the supporting ring 5 and an inner U-shaped supporting ring 7 which in this embodiment comprises two side rings 8, 9 connected e.g. by welding or glueing, and the shanks of which side rings extend from the centre to enclose with some space mainly the entire body portion 6 of the outer supporting ring 5. Between the shanks of the side rings 8, 9 and the body portion 6 of the outer supporting ring 5 are furthermore arranged sealing members 12, 13 which preferably consist of flock or felt rings known per se whereby the friction seal is formed. A very good protection against dust and other dirt particles is thereby obtained at the same time as the sealing device 1 is permeable to air.

FIG. 3 shows a further embodiment of a sealing device according to the invention. The inner supporting ring 7 is here formed by two side rings 15, 16 which form said shanks, which with some space enclose the body portion 18 of the outer supporting ring 5 the side surfaces of which body portion 18 is covered with flock or felt rings which thereby fill out the space between the body portion 18 and the side rings 15, 16. Said sealings can of course also be connected to the side rings 15, 16 at their sides turned against the body portion 18 of the supporting ring 5. The side rings 15, 16 consist here of washer formed members, which are fixedly connected to a carrying member 19 in such a manner that the outer edges of the carrying member 19 have been bent upwards or folded. In order to bring about a reliable sealing against the surrounding machine members independent of manufacturing tolerances an O-ring 20 e.g. or rubber is arranged in a groove 21 formed in the outer supporting ring 5.

In the case where the sealing device 1 also shall seal off against fluids such as oil or other liquids it is advantageous to arrange a lip seal 22, 23 on one or both sides of the original sealing device 1. At least one additional carrying member 24, 25 is hereby fixed to the outer supporting ring 5 and this carrying member carries the lip seals 22, 23 which are preferably made of rubber, whereby the lip seals 22 and 23 at the rotation of the inner and outer supporting rings 7, 5 relative to each other will slide against the shank of the inner supporting ring 7 whereby a good sealing effect against fluids is obtained. The lip seal can either be O-rings of rubber or rubber rings having mainly rectangular cross section.

The supporting rings 5, 7 forming part of the sealing device and also where appropriate the carrying member 19, can be made resilient either by being manufactured from an elastic material such as rubber or plastic or when metal is used as the manufacturing material by design steps at the manufacture. This means that it is required less close tolerances at the manufacture of housings and shafts.

What is claimed is:

1. A seal for sealing the annular space between confronting annular surfaces in inner and outer machine members which are rotatable relative to one another comprising an outer annular support ring of generally T-shaped cross section, the cross bar of the outer annular support ring engaging in the annular surface of said outer machine member, a pair of side ring members of L-shaped cross section which are nested and secured together to form a U-shaped annular ring mounted on the confronting surface of said inner machine member which circumscribes and encloses substantially the entire body portion of said outer annular support ring, a pair of disc-like sealing members in the annular space between the sidewalls of said U-shaped annular ring members and the shank of said outer annular support ring including flexible air permeable sealing elements filling the space between the shank of said outer support ring and the opposing spaced legs of the inner annular member, said inner and outer supporting rings together with said sealing means forming an integral unit and said seal being symmetrical through a transverse center plane.

2. A sealing device as claimed in claim 1 wherein said disc-like sealing members are flocked rings.

3. A seal as claimed in claim 1 wherein said disc-like sealing members are felt rings.